Patented Sept. 6, 1949

2,481,159

UNITED STATES PATENT OFFICE 2,481,159

PRODUCTION OF POLYCHLORO-HYDROCARBONS

Louis Schmerling, Riverside, Ill., assignor to Universal Oil Products Company, Chicago, Ill., a corporation of Delaware No Drawing. Application November 29, 1946, Serial No. 713,084

11 Claims. (Cl. 260—648)

1

This application is a continuation-in-part of my co-pending application Serial No. 613,707 filed August 30, 1945 as a continuation-in-part of application Serial No. 496,792 filed July 30, 1943 and of application Serial No. 465,097 filed November 9, 1942, both now abandonded.

This invention relates to the condensation of 1,1-di-chloroethylene and a monochloro-hydrocarbon selected from the group consisting of a monochlorocycloalkane and a monochloroalkane having at least three carbon atoms per molecule.

By the term "condensation" used in this specification and in the claims, I mean the chemical combination of the aforesaid 1,1-dichloroethylene and monochloro-hydrocarbon to produce a higher boiling polychloro-hydrocarbon in which the number of carbon atoms is equal to the sum of the number of carbon atoms in the reactants.

An object of this invention is to produce a member of the group consisting of a 1,1-trichloroalkane, a 1,1,1-trichloroalkylcycloalkane, a 1,1-dichloroalkene and a 1,1-dichloroalkenylcycloalkane.

Another object of this invention is to produce 1,1,1-trichloro-3,3-dimethylbutane.

Still another object of this invention is to produce 1,1,1-trichloro-2-cyclohexylethane.

One specific embodiment of the present invention relates to a process which comprises condensing 1,1-dichloroethylene and a monochlorohydrocarbon selected from the group consisting of a monochlorocycloalkane and a monochloroalkane having at least three carbon atoms per molecule in the presence of a Friedel-Crafts catalyst.

Another embodiment of this invention relates to a process which comprises condensing 1,1-dichloroethylene and a monochloro-hydrocarbon selected from the group consisting of a monochlorocycloalkane and a monochloroalkane having at least three carbon atoms per molecule in the presence of a Friedel-Crafts metal halide catalyst.

Monochloro-hydrocarbons containing at least three carbon atoms per molecule which are usable as starting materials in my process include monochloroalkanes and monochlorocycloalkanes.

The monochloro-hydrocarbon starting material may be produced by the addition of hydrogen chloride to a monoolefin having at least three carbon atoms per molecule. These monoolefins include both alkenes and cycloalkenes. Such addition of hydrogen chloride to an olefin

2 having at least three carbon atoms per molecule results in the production of secondary alkyl halides from normal olefins and other non-tertiary olefins containing three or more carbon atoms per molecule and in the formation of tertiary alkyl halides from tertiary olefins such as isobutylene, trimethylethylene, etc. Primary monohaloalkanes also utilizable in the present process are obtainable by other means such as the treatment of a primary alcohol having at least three carbon atoms per molecule with hydrogen chloride in the presence of a suitable catalyst such as zinc chloride. Secondary and tertiary alcohols also react with hydrogen chloride to produce secondary and tertiary alkyl halides. The monochlorohydrocarbon may also be obtained by the chlorination of a saturated hydrocarbon (alkane or cycloalkane).

1,1-dichloroethylene also employed as a starting material in my process is sometimes referred to as vinylidene chloride.

Suitable catalysts for the process of the present invention comprise Friedel-Crafts catalysts including Friedel-Crafts metal halides and also boron trifluoride. Friedel-Crafts metal halides comprise particularly substantially anhydrous compounds of aluminum with a middle halogen thus including aluminum chloride and aluminum bromide. Other suitable Friedel-Crafts metal halide catalysts are ferric chloride, bismuth chloride, zinc chloride, zirconium chloride, and titanium tetrachloride, which are employed in the catalytic condensation of 1,1-dichloroethylene and a monochloroalkane or a monochlorocycloalkane. The different catalytic materials which may be employed in the process are utilized singly, composited with each other, dissolved in a suitable solvent such as nitroparaffin or an ether, or deposited on solid carriers or supporting materials to produce catalysts composited of desired activities.

Suitable catalyst carriers or supports include both adsorptive and substantially non-adsorptive materials, for example, alumina, crushed porcelain, raw and acid treated clays, diatomaceous earth, pumice, firebrick, activated charcoal, etc. The carriers should be substantially inert in the sense that substantially no interaction which is detrimental to the activity or selectivity of the catalyst composite occurs between the carrier and the Friedel-Crafts halide catalysts.

Although the process of the present invention is not understood completely, it appears to involve the addition of a molecule of a monochlorohydrocarbon containing at least three carbon atoms per molecule to a molecule of 1,1-dichloroethylene. Thus the reaction of such a monochloro-hydrocarbon with 1,1-dichloroethylene produces a trichloro-hydrocarbon in which the number of carbon atoms is equal to the sum of the number of carbon atoms in the reactants. For example, the condensation of tertiary butyl chloride with 1,1-dichloroethylene (vinylidene chloride) in the presence of a Friedel-Crafts catalyst produces 1,1,1-trichloro-3,3-dimethylbutane as illustrated by the following equation:

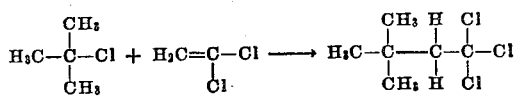

In many cases, the condensation reaction is accompanied by dehydrochlorination of the condensation product. For example, the loss of one molecular proportion of hydrogen chloride from one molecular proportion of 1,1,1-trichloro-3,3-dimethylbutane produces 1,1-dichloro-3,3-dimethyl-1-butene. The relative amount of trichloroalkane and dichloroalkene (or of trichlorocycloalkane and dichloroalkenylcycloalkane) will depend largely upon the reaction conditions (chiefly temperature) and on the particular reactants.

The condensation of a cycloalkylchloride with 1,1-dichloroethylene is illustrated below by the equation which represents the addition reaction which occurs between equal molecular proportions of cyclohexylchloride and 1,1-dichloroethylene.

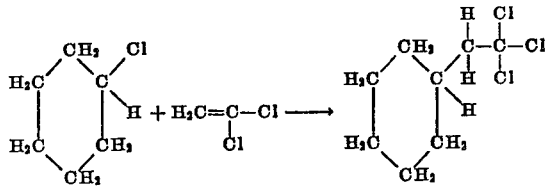

This condensation reaction thus produces 1,1,1-trichloro-2-cyclohexylethane, part of which sometimes undergoes dihydrochlorination to produce 1,1-dichloro-2-cyclohexylethylene.

The process of this invention thus permits the preparation of saturated trichlorides in which all the chlorine atoms are attached to the same primary carbon atom and of monoolefinic dichlorides in which both chlorine atoms are attached to a primary carbon atom which is part of the olefinic linkage (i. e., the dichloride is an alkylvinylidene chloride or a cycloalkylvinylidene chloride). Furthermore, when a tertiary chloride is employed as starting material, the di- and trichlorinated products are further characterized by the presence of a quaternary carbon atom.

The trichloroalkanes have unexpectedly low boiling points. Thus, for example, 1,1,1-trichloro-3,3-dimethylbutane boils at approximately 166–167° C. at 760 mm. pressure, whereas the isomeric 1,1,2-dichloro-3,3-dimethylbutane boils at 199° C. at the same pressure.

Both the trichlorides and the dichlorides may be hydrolized to yield carboxylic acids. In these cases, in which the 1,1-dichloroethylene is condensed with a tertiary chloride, the hydrolysis product will be an acid which contains a quaternary carbon atom.

The production of trichlorohydrocarbons as herein set forth is carried out by reacting vinylidene chloride, also called 1,1-dichloroethylene, in the presence of a Friedel-Crafts catalyst with a member of the group consisting of a monochlorocycloalkane and a monochloroalkane having at least three carbon atoms per molecule. This condensation reaction is carried out at a temperature of from about −30° to about 100° C. and at a pressure of from substantially atmospheric to sufficiently superatmospheric to maintain at least a portion of the reactants in liquid phase. The reaction of 1,1-dichloroethylene with different monochloroalkanes and monochlorocycloalkanes are not necessarily effected with equal ease or under the same conditions of operation. When using aluminum chloride as catalyst, the lower operating temperatures within the above indicated limits are generally preferred since this metal halide has a relatively high activity. Ferric chloride and zirconium chloride are generally employed at somewhat higher temperatures (from about −10° to about 40° C.) than that used when aluminum chloride is the essential active ingredient of the catalyst. The higher operating temperatures (about 20° to about 100° C.) are sometimes employed when using a less active catalyst, such as bismuth chloride or zinc chloride.

The reaction of a monochloro-hydrocarbon having at least three carbon atoms per molecule with vinylidene chloride may be carried out in the presence of a Friedel-Crafts metal halide catalyst and also boron trifluoride by using either batch or continuous operations. In batch type operations, desired proportions of the mentioned reactants are introduced to a suitable reactor containing a Friedel-Crafts catalyst either as such, composited with a carrier, or dissolved in a solvent and the resultant commingled materials are contacted until a substantial proportion of the reactants are converted into the desired condensation product. The reaction mixture after separation from the catalyst is fractionally distilled to separate the unconverted 1,1-dichloroethylene and monochloroalkane or monochlorocycloalkane from higher boiling trichloroalkanes, trichloroalkylcycloalkanes, and dichloroalkenes produced from the saturated trichloro compounds by the loss of a molecular proportion of hydrogen chloride.

Continuous operation may be carried out by conducting a mixture of 1,1-dichloroethylene and a monochlorocycloalkane or monochloroalkane having at least three carbon atoms per molecule through a reactor of suitable design containing a fixed bed of catalyst of the Friedel-Crafts type. In this type of treatment the operating conditions may be adjusted considerably and may differ somewhat from those employed in batch-type operation. Thus when a mixture of a monochloroalkane and 1,1-dichloroethylene is passed through a tubular reactor containing aluminum chloride, bismuth chloride, ferric chloride, etc., supported by granular porcelain, the formation of desired trichloroalkane may be effected by using a higher temperature and shorter contact time than when contacting a similar mixture and catalyst at a lower temperature in a batch-type reactor, such as an autoclave provided with suitable stirring or agitating means.

The following examples are given to illustrate the character and results obtained in the present process, although the data presented are not introduced with the intention of unduly restricting the generally broad scope of the invention.

*Example I*

A mixture of 40 g. of vinylidene chloride and 47 g. of t-butyl chloride was cooled to 8° C. in a glass reactor and shaken with 1.5 g. of ferric chloride. The reaction which occurred raised the temperature of the mixture to 23° C. even though the reaction vessel was cooled in an ice-water bath. The temperature dropped to 10° after about 2 minutes. The vessel containing the reaction mixture was permitted to stand in the ice-water bath for 20 minutes more after which it was washed, dried, and distilled. There was obtained 38 g. (60% of the theoretical) of 1,1-dichloro-3,3-dimethyl-1-butene boiling at 55–56° C. at 39 mm. pressure (138–139° C. at 760 mm.) $n_D^{20}$ 1.4538; and 11 g. (14% of the theoretical) of 1,1,1-trichloro-3,3-dimethylbutane boiling at 81–82° C. at 39 mm. pressure (167–168° C. at 760 mm.) $n_D^{20}$ 1.4601.

*Example II*

In another run similar to that described in Example I, 93 g. of vinylidene chloride, 98 g. of t-butyl chloride, and 2 g. of ferric chloride were mixed but the reaction temperature was kept at about −10° to +10° C. during about 45 minutes. This reaction yielded 19 g. (13% of the theoretical) of 1,1-dichloro-3,3-dimethyl-1-butene, boiling at 59 to 61° at 40 mm. pressure, $n_D^{20}$ 1.4535, and 119 g. (65% of the theoretical) of 1,1,1-trichloro-3,3-dimethylbutane boiling chiefly at 64–65° C. at 18 mm. pressure, $n_D^{20}$ 1.4506, density about 1.15.

The structures of the dichloro and the trichloro compounds were proved by hydrolyzing the compounds by heating with water in a sealed tube at 275° C. Tertiary butyl acetic acid was obtained in each case.

*Example III*

A solution of 117 g. of vinylidene chloride in 95 g. of isopropyl chloride was added during one and one-half hours to a stirred suspension of 9 g. of aluminum chloride in 62 g. of n-pentane, the reaction temperature being maintained at 1–3° C. Additional catalyst (5 g.) was added and the temperature was permitted to rise (stirring continued) to 20° C. during the next one and one-half hours. The liquid product was decanted from the catalyst layer (18 g.) washed, dried, and fractionated. There was obtained 51 g. (30% of the theoretical) of 1,1-dichloro-3-methyl-1-butene boiling at 113–115° C. at 745 mm. pressure, $n_D^{20}$ 1.4458; $d_4^{20}$ 1.0686. There was also obtained about 5 g. (2% of the theoretical) of 1,1,1-trichloro-3-methylbutane as well as 48 g. (30% of the theoretical) of 1,1,1-trichloroethane. The major portion of the trichloromethylbutane formed as primary product underwent dehydrochlorination to yield the dichloromethylbutene, the hydrogen chloride so formed adding to vinylidene chloride to produce the 1,1,1-trichloroethane.

Higher yields of the trichloromethylbutane may be obtained by employing lower reaction temperatures.

*Example IV*

By employing essentially the same procedure as used in Examples I and II, the reaction of cyclohexyl chloride with vinylidene chloride in the presence of aluminum chloride at 0–20° C. yielded 1,1-dichloro-2-cyclohexylethylene as the major product together with a smaller amount of 1,1,1-trichloro-2-cyclohexylethane. Hydrolysis of the dichlorocyclohexylethylene at 275° C. yielded cyclohexylacetic acid.

The foregoing specification and examples illustrate the novelty and utility of the present process, although neither section is introduced with the intention of limiting unduly the generally broad scope of the invention.

I claim as my invention:

1. A process which comprises condensing 1,1-dichloroethylene and a monochloro-hydrocarbon selected from the group consisting of a monochlorocycloalkane and a monochloroalkane having at least three carbon atoms per molecule in the presence of a Friedel-Crafts catalyst.

2. A process which comprises condensing 1,1-dichloroethylene and a monochloro-hydrocarbon selected from the group consisting of a monochlorocycloalkane and a monochloroalkane having at least three carbon atoms per molecule in the presence of a Friedel-Crafts metal halide catalyst.

3. A process which comprises condensing 1,1-dichloroethylene and a monochloro-hydrocarbon selected from the group consisting of a monochlorocycloalkane and a monochloroalkane having at least three carbon atoms per molecule in the presence of a Friedel-Crafts catalyst at a temperature of from about −30° to about 100° C.

4. A process which comprises condensing 1,1-dichloroethylene and a monochloro-hydrocarbon selected from the group consisting of a monochlorocycloalkane and a monochloroalkane having at least three carbon atoms per molecule in the presence of a Friedel-Crafts metal halide catalyst at a temperature of from about −30° to about 100° C.

5. A process for producing a trichloroalkane and a dichloroalkene which comprises reacting 1,1-dichloroethylene and a tertiary monochloroalkane in the presence of a Friedel-Crafts metal halide catalyst at a temperature of from about −30° to about 100° C.

6. A process for producing 1,1,1-trichloro-3,3-dimethylbutane and 1,1-dichloro-3,3-dimethyl-1-butene which comprises reacting 1,1-dichloroethylene and tertiary butyl chloride at a temperature of from about −30° to about 100° C. in the presence of a Friedel-Crafts metal chloride catalyst.

7. A process for producing 1,1,1-trichloro-2-cyclohexylethane and 1,1-dichloro-2-cyclohexylethylene which comprises reacting 1,1-dichloroethylene and cyclohexylchloride at a temperature of from about −30° to about 100° C. in the presence of a Friedel-Crafts metal chloride catalyst.

8. A process for producing 1,1,1-trichloro-3-methylbutane and 1,1-dichloro-3-methyl-1-butene which comprises reacting 1,1-dichloroethylene and isopropyl chloride at a temperature of from about −30° to about 100° C. in the presence of a Friedel-Crafts metal chloride catalyst.

9. A process for producing 1,1,1-trichloro-3,3-dimethylbutane and 1,1-dichloro-3,3-dimethyl-1-butene which comprises reacting 1,1-dichloroethylene and tertiary butyl chloride at a temperature of from about −10° to about 40° C. in the presence of ferric chloride.

10. A process for producing 1,1,1-trichloro-2-cyclohexylethane and 1,1-dichloro-2-cyclohexylethylene which comprises reacting 1,1-dichloroethylene and cyclohexyl chloride at a temperature of from about −10° to about 40° C. in the presence of ferric chloride.

11. A process for producing 1,1,1-trichloro-3-methylbutane and 1,1-dichloro-3-methyl-1-butene which comprises reacting 1,1-dichloroethylene and isopropyl chloride at a temperature of from about −30° to about 40° C. in the presence of aluminum chloride.

LOUIS SCHMERLING.

REFERENCES CITED

The following references are of record in the file of this patent:

UNITED STATES PATENTS

| Number | Name | Date |
|---|---|---|
| 2,068,772 | Sixt | Jan. 26, 1937 |
| 2,419,500 | Peterson | Apr. 22, 1947 |

OTHER REFERENCES

Schmerling, "Jour. Am. Chem. Soc.", vol. 67, pages 1152–4 (1945).

Schmerling, "Jour. Am. Chem. Soc.", vol. 68, pages 1650–7 (1946).